No. 741,305. PATENTED OCT. 13, 1903.
C. S. CAIRD.
AXLE.
APPLICATION FILED NOV. 13, 1902.
NO MODEL.
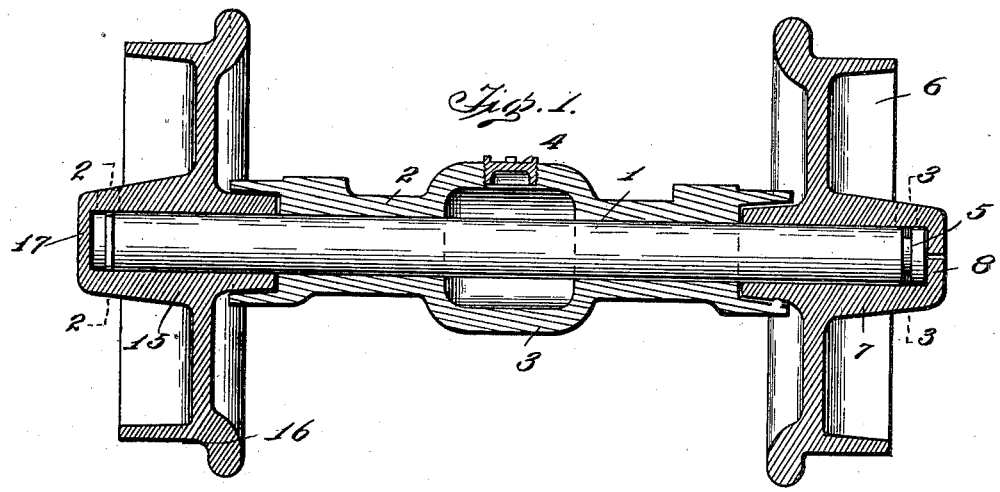
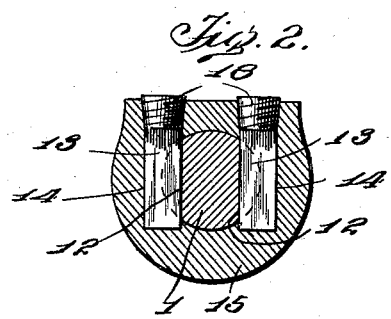
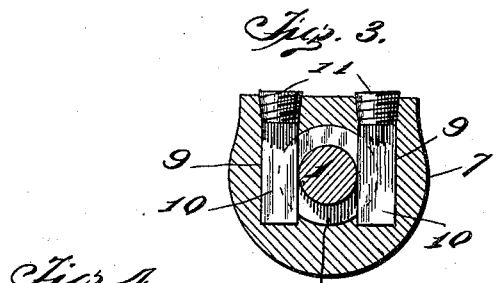
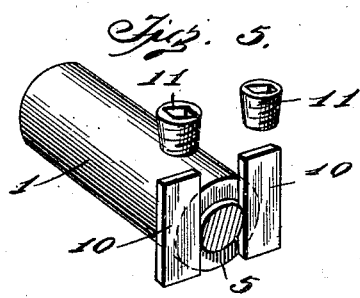
Witnesses
Inventor
Charles S. Caird
By Mason Fenwick Lawrence
Attorneys No. 741,305. Patented October 13, 1903.

UNITED STATES PATENT OFFICE.

CHARLES S. CAIRD, OF HELENA, MONTANA.

AXLE.

SPECIFICATION forming part of Letters Patent No. 741,305, dated October 13, 1903.

Application filed November 13, 1902. Serial No. 131,253. (No model.)

*To all whom it may concern:*

Be it known that I, CHARLES S. CAIRD, a citizen of the United States, residing at Helena, in the county of Lewis and Clarke and State of Montana, have invented certain new and useful Improvements in Axles; and I do hereby declare the following to be a full, clear, and exact description of the invention, such as will enable others skilled in the art to which it appertains to make and use the same.

The present invention relates to improvements in axles, and particularly to such as are adapted to carry one loose and one fixed wheel.

The object in view is the provision of means for retaining a wheel on an axle, permitting rotation thereof free of the axle, and preventing displacement of the wheel, means being provided for fixedly securing the other wheel to the axle.

With this and other objects in view the invention consists of an axle formed near one end with an annular groove and near the other with one or more transverse grooves and means arranged in said grooves for retaining a wheel at each end of said axle.

It also consists in certain other novel constructions, combinations, and arrangements of parts, as will be hereinafter fully described and claimed.

In the accompanying drawings, Figure 1 represents a longitudinal vertical central section through a pair of car-wheels and axle-box, an axle embodying the features of the present invention being shown in elevation in connection therewith. Fig. 2 represents a transverse section taken on the plane of line 2 2 of Fig. 1. Fig. 3 represents a similar section taken on the plane of line 3 3 of Fig. 1. Fig. 4 represents an enlarged detail perspective view of the lubricating-receptacle plug. Fig. 5 represents a detail perspective of a fragment of the annularly-grooved end of the axle with the surrounding parts.

In order to facilitate passing about a curve I employ, as indicated in the accompanying drawings, a suitable axle and means for rigidly carrying a wheel at one end and rotatably carrying a wheel at the other, said axle being indicated by the numeral 1. The axle 1 is preferably inclosed by a suitable box 2, formed with a receptacle 3 for a suitable lubricant, which may be introduced into the same through an aperture formed therein, closed by a plug 4. In operation the lubricant is fed along the axle by the rotation thereof. One end of axle 1 is formed with an annular groove 5. The said end of the axle carries a suitable wheel 6, formed with a hub 7 of any preferred type, preferably having a hooded or closed end 8. Suitable vertical grooves 9 9 are formed in the hub 7 and are designed to receive plates 10 10, extending into the groove 5. The upper ends of grooves 9 are preferably threaded and receive plugs 11 11 for retaining the plates 10 in position, whereby the wheel 6 will be secured to axle 1 and retained against lateral movement, while free to rotate on said axle. The opposite end of axle 1 is preferably formed with a plurality of grooves 12 12, extending transverse the same for receiving plates 13 13, extending into the same and lying within grooves 14 14, formed vertically in a hub 15, carrying a wheel 16, said hub being formed with a hooded or closed end 17. The upper ends of grooves 14 are preferably threaded for receiving plugs 18 18, which retain the plates 13 in position.

It will be observed that by the structure just specified the wheel 16 will be locked onto axle 1, so as to rotate therewith, while wheel 6 will be left free to rotate independently of said axle. It will further appear that only one of plates 10 and one of plates 13 need necessarily be employed, a plurality of such plates being used for the purposes of strength.

Although I have specifically set forth one particular embodiment of the present invention, yet it will be understood that I do not desire to be limited thereby to the specific details set forth, but shall feel at liberty to deviate therefrom to any extent within the spirit and scope of the invention.

Having thus fully described my invention, what I claim as new, and desire to secure by Letters Patent, is—

1. A device of the class described, comprising an axle formed near one end with an annular groove and near the other with a transverse groove, and means arranged in said groove for retaining a wheel at each end of said axle, substantially as described.

2. In a device of the class described the combination with suitable wheels of a revoluble axle connecting the same, the axle having at one end an annular groove, locking-plates arranged in the hub of one of said wheels and extending into the said groove for movably holding the wheel in position on said axle, the other end of said axle having a segmental slot formed therein and a key or locking-plate in the hub of the second wheel for fitting into said slot and locking the wheel rigidly to the shaft, substantially as described.

3. A vehicle-axle mechanism comprising an axle, wheels for supporting the same, the axle being formed with an annular groove at one end, oppositely-arranged slots taken upon the chords of the axle, at the other end keys arranged in recesses in one of the wheels and extending into the annular groove at one end of the axle for revolubly securing the wheel to the axle, plates or keys situated in recesses in another wheel at the other end of the axle and engaging the chord-slots for rigidly securing a second wheel to the axle, substantially as described.

4. In a mechanism of the class described the combination of an axle having an annular groove at one end and chord-slots at the other end, wheels for engaging the opposite ends of the axle, having hubs for inclosing ends of said axle, the said hubs being provided with recesses, keys or plates inserted in said recesses, the keys of one hub engaging the annular groove of the axle, while the keys of the other hub engage the chord-slots, screw-plugs for locking the said keys in position in the said hubs, substantially as described.

5. A mechanism of the class described comprising an axle having an annular groove at one end and chord-slots at the other end, wheels having inclosing hubs for engaging the ends of said axle, the said hubs having key-seats formed therein opposite the said annular groove and the said chord-slots, keys located in the said seats and engaging the said groove and slots and bearing-boxes arranged upon the central portion of the axle and filling the space between the hubs substantially as described.

In testimony whereof I hereunto affix my signature in presence of two witnesses.

CHARLES S. CAIRD.

Witnesses:
P. G. SCHROEDER,
A. W. SMITH.